US008889090B2

(12) United States Patent
Izaki et al.

(10) Patent No.: US 8,889,090 B2
(45) Date of Patent: Nov. 18, 2014

(54) METHOD OF RECOVERING AMMONIA AND METHOD OF RECYCLING AMMONIA BY USING THE SAME

(71) Applicant: Japan Pionics Co., Ltd., Hiratsuka (JP)

(72) Inventors: Kansei Izaki, Kanagawa (JP); Masanori Iwaki, Kanagawa (JP); Toshio Akiyama, Kanagawa (JP)

(73) Assignee: Japan Pionics Co., Ltd., Kanagawa (JP)

( * ) Notice: Subject to any disclaimer, the term of this patent is extended or adjusted under 35 U.S.C. 154(b) by 0 days.

(21) Appl. No.: 13/901,684

(22) Filed: May 24, 2013

(65) Prior Publication Data

US 2013/0312456 A1  Nov. 28, 2013

(30) Foreign Application Priority Data

May 25, 2012 (JP) ................. 2012-119511

(51) Int. Cl.
  *B01D 53/46*   (2006.01)
  *B01D 53/58*   (2006.01)
  *C01C 1/00*    (2006.01)
  *C01C 1/12*    (2006.01)
  *F25J 3/08*    (2006.01)

(52) U.S. Cl.
  CPC ... *F25J 3/08* (2013.01); *C01C 1/12* (2013.01); *Y10S 438/905* (2013.01)
  USPC ........ 423/237; 423/248; 423/215.5; 423/352; 438/905

(58) Field of Classification Search
  CPC ...... B01D 53/002; B01D 53/46; B01D 53/58; C01C 1/00; F25J 3/08
  USPC .............. 423/237, 248, 215.5, 352; 438/905
  See application file for complete search history.

(56) References Cited

U.S. PATENT DOCUMENTS

2013/0011321 A1*  1/2013  Lee et al. ................ 423/352

FOREIGN PATENT DOCUMENTS

| CN | 102728159   | 10/2012 |
| CN | 203150595   | 8/2013  |
| JP | 2000-317246 | 11/2000 |
| JP | 2008-7378   | 1/2008  |
| JP | 2008013406 A| 1/2008  |

* cited by examiner

*Primary Examiner* — Timothy Vanoy
(74) *Attorney, Agent, or Firm* — Antonelli, Terry, Stout & Kraus, LLP.

(57) ABSTRACT

There are provided methods capable of easily and efficiently recovering and recycling ammonia from exhaust gas containing a small amount of ammonia, the exhaust gas being exhausted from a production process of a gallium nitride compound semiconductor. The method of recovering ammonia includes filtering exhaust gas containing ammonia, hydrogen, nitrogen, and a solid compound with a filter to remove the solid compound from the exhaust gas; pressurizing and cooling the filtered exhaust gas with a heat pump to liquefy ammonia contained in the filtered exhaust gas; and separating liquefied ammonia from hydrogen and nitrogen to recover liquefied ammonia. The method of recycling ammonia includes evaporating recovered liquid ammonia; mixing the evaporated ammonia with another crude ammonia to obtain mixed gas; purifying the mixed gas; and supplying the purified gas to the production process of a gallium nitride compound semiconductor.

18 Claims, 3 Drawing Sheets

METHOD OF RECOVERING AMMONIA AND METHOD OF RECYCLING AMMONIA BY USING THE SAME

BACKGROUND OF THE INVENTION

1. Field of the Invention

The present invention relates to a method of recovering ammonia by pressurizing and cooling exhaust gas containing ammonia, the exhaust gas being exhausted from a production process of a gallium nitride compound semiconductor and then by liquefying ammonia contained in the exhaust gas to recover the liquefied ammonia from the exhaust gas. The present invention also relates to a method of recycling ammonia, including supplying the recovered ammonia to the production process of a gallium nitride compound semiconductor as a source gas.

2. Related Art

The gallium nitride compound semiconductor is extensively used as a device such as a light emitting diode or a laser diode. A production process of this gallium nitride compound semiconductor (gallium nitride compound semiconductor process) is typically conducted by vapor-depositing a gallium nitride compound on a substrate of sapphire or the like through the MOCVD method. As the source gas used for this production process, for example, a group III source gas including trimethyl gallium, trimethyl indium, and trimethyl aluminum, and a group V source gas including ammonia are used.

Ammonia is required in very large quantities compared with a group III gas source such as trimethyl gallium because of the poor degradation efficiency of ammonia. Ammonia used for the production process of a gallium nitride compound semiconductor is highly pure ammonia generated by distilling or rectifying industrial ammonia or high-priced ammonia generated by further purifying this highly pure ammonia. Most of the ammonia is not used in a production process of a gallium nitride compound semiconductor and wasted in large quantities as unreacted. Therefore, it is desirable that ammonia be recovered and recycled by pressurizing and cooling exhaust gas containing ammonia, the exhaust gas being exhausted from a production process of a gallium nitride compound semiconductor and then by liquefying ammonia contained in the exhaust gas to recovering liquefied ammonia from the exhaust gas.

This led to propose a method of recovering ammonia gas, including, for example, a dissolution step of dissolving ammonia gas contained in exhaust gas in water, the exhaust gas being exhausted from a process such as a production process of a gallium nitride compound semiconductor; a distillation step of distilling the aqueous ammonia to separate ammonia gas from water; and a liquefaction step of liquefying the separated ammonia gas (JP 2008-7378A). Furthermore, another method was proposed, including cooling and passing exhaust gas containing ammonia through a multitubular adsorber filled with adsorbent for ammonia, the exhaust gas being exhausted from a production process of a gallium nitride compound semiconductor and the like; and after adsorbing ammonia from exhaust gas, desorbing and recovering ammonia under reduced pressure while heating the multitubular adsorber (JP 2000-317246 A).

SUMMARY OF THE INVENTION

However, in the method of recovering ammonia described in JP 2008-7378 A, the step of dissolving ammonia should be repeated to increase the concentration of ammonia. Furthermore, in the method of recovering ammonia described in JP 2008-7378 A, source gas used in a production process of a gallium nitride compound semiconductor requires a very low concentration of water. This requires ammonia obtained by distilling aqueous ammonia that has reached a predetermined concentration to be highly dehumidified. The ammonia gas-recovery unit described in JP 2000-317246 A has the disadvantage that the amount of adsorbed and recovered ammonia is small.

Therefore, an objective of the present invention is to provide a method capable of easily and efficiently recovering and recycling ammonia from exhaust gas containing a small amount of ammonia, the exhaust gas being exhausted from a production process of a gallium nitride compound semiconductor.

As the result of their extensive study to solve the objective, the inventors found that filtering exhaust gas with a filter to remove a solid compound from the exhaust gas and then pressurizing and cooling the filtered exhaust gas with a heat pump to efficiently liquefy a high concentration of ammonia contained in the exhaust can easily separate ammonia from hydrogen and nitrogen. The inventors also found that the main components of impurities of ammonia recovered by this recovery method are hydrogen and nitrogen not causing a negative effect on a production process of a gallium nitride compound semiconductor. Based on these findings, the method of recovering ammonia and a method of recycling ammonia by using the same have been achieved.

Specifically, the present invention is a method of recovering ammonia including: filtering exhaust gas containing ammonia, hydrogen, nitrogen, and a solid compound with a filter to remove the solid compound from the exhaust gas, the exhaust gas being exhausted from a production process of a gallium nitride compound semiconductor; pressurizing and cooling the filtered exhaust gas with a heat pump to liquefy ammonia contained in the filtered exhaust gas; and separating the liquefied ammonia from hydrogen and nitrogen to recover the liquefied ammonia.

The present invention is also a method of recycling ammonia including: evaporating liquid ammonia recovered from a production process of a gallium nitride compound semiconductor by the method of recovering ammonia; mixing the evaporated ammonia with another crude ammonia to obtain mixed gas; purifying the mixed gas; and supplying the purified gas to the production process of a gallium nitride compound semiconductor.

The method of recovering ammonia according to the present invention can efficiently easily recover ammonia from exhaust gas containing ammonia, hydrogen, nitrogen, and a solid compound, the exhaust gas being exhausted from a production process of a gallium nitride compound semiconductor. Furthermore, the main components of impurities of the recovered ammonia are hydrogen and nitrogen not causing a negative effect on a production process of a gallium nitride compound semiconductor so as to recycle and supply ammonia to the production process of a gallium nitride compound semiconductor after easy purification.

DETAILED DESCRIPTION OF THE INVENTION

The present invention is applied to a method of recovering ammonia by pressurizing and cooling exhaust gas containing ammonia, the exhaust gas being exhausted from a production process of a gallium nitride compound semiconductor, to liquefy ammonia contained in the exhaust gas and recover liquefied ammonia from the exhaust gas. The present invention is also applied to a method of recycling ammonia, including supplying the recovered ammonia to the production process of a gallium nitride compound semiconductor as a source gas. The production process of a gallium nitride compound semiconductor in the present invention subjects a nitride semiconductor consisting of a compound one or two or more kinds of metals selected from gallium, indium, and aluminum; and nitrogen to crystal growth.

The method of recovering ammonia and the method of recycling ammonia by using the same according to the present invention will be explained in detail below in reference to FIGS. 1-5. However, the present invention is not limited to the following explanation.

Figure 1:
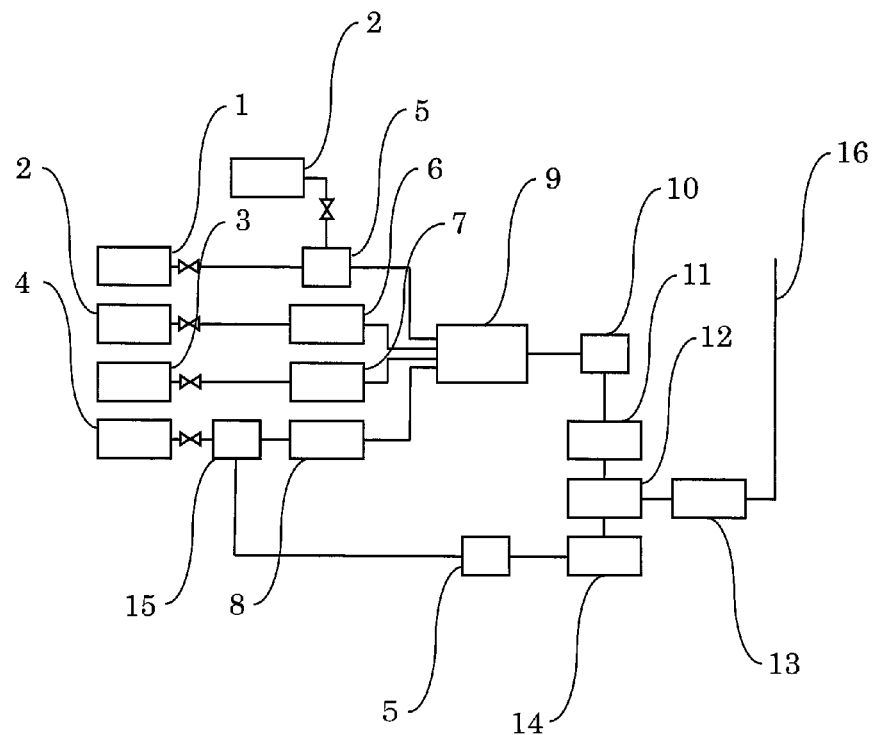
FIG. 1 shows the schematic diagram illustrating one example of a system related to the present invention.
Figure 2:
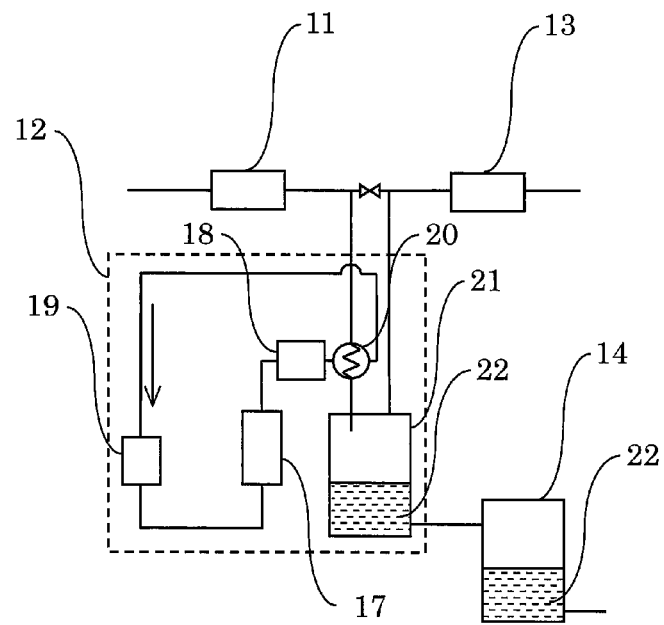
FIG. 2 shows the schematic diagram illustrating one example of an ammonia-recovery unit used in the present invention.
Figure 3:
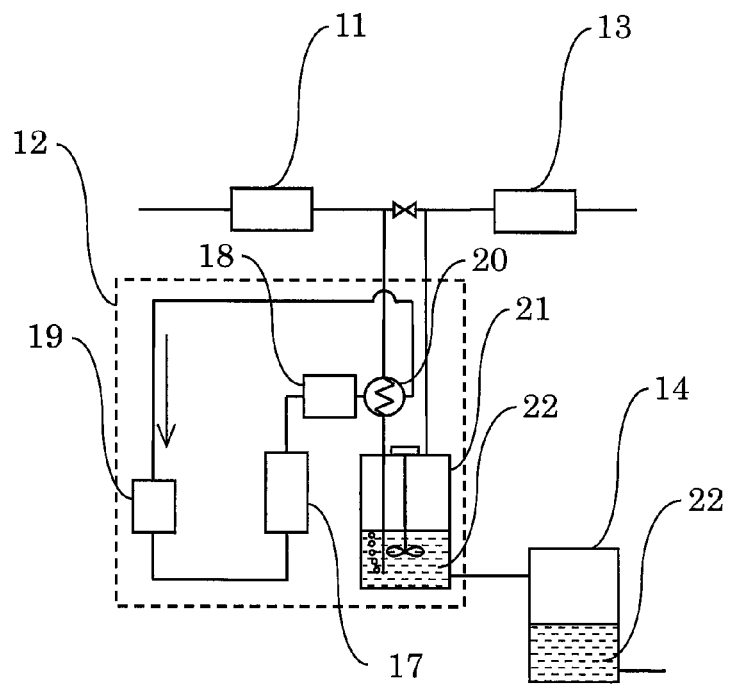
FIG. 3 shows the schematic diagram illustrating another example of an ammonia-recovery unit used in the present invention.
Figure 4:
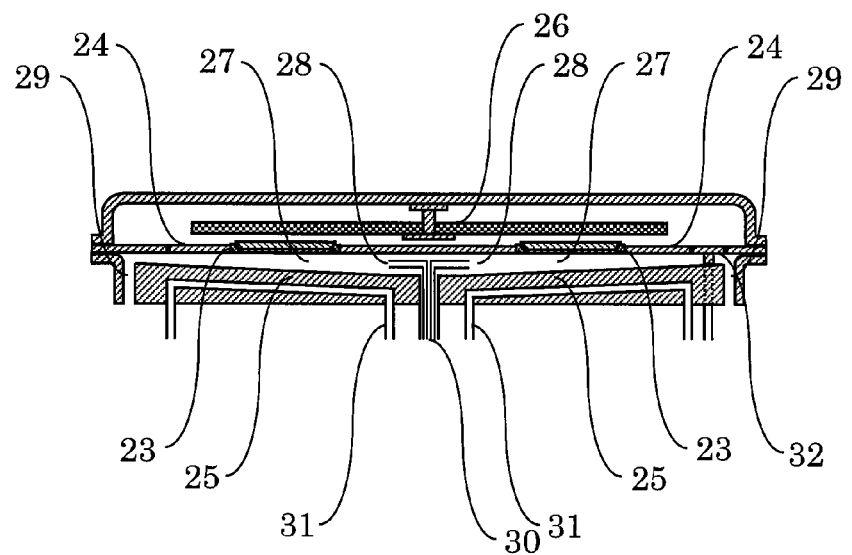
FIG. 4 shows the schematic diagram illustrating one example of a vapor deposition device applicable to the present invention.
Figure 5:
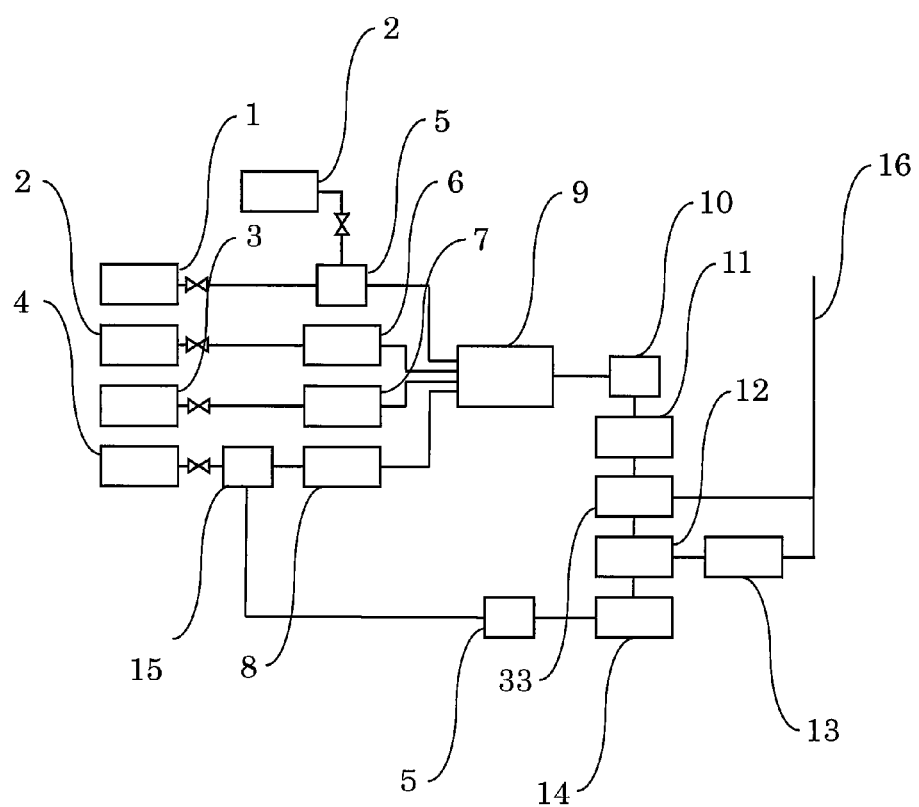
FIG. 5 shows the schematic diagram illustrating another example of a system related to the present invention.

FIGS. 1 and 5 each show the schematic diagram illustrating one example of a system related to the method of recovering ammonia according to the present invention and the method of recycling ammonia by using the same. FIGS. 2 and 3 each show the schematic diagram illustrating one example of an ammonia-recovery unit used in the present invention. FIG. 4 shows the schematic diagram illustrating one example of a vapor deposition device applicable to the present invention.

The method of recovering ammonia according to the present invention includes: filtering exhaust gas containing ammonia, hydrogen, nitrogen, and a solid compound with a filter to remove the solid compound from the exhaust gas, the exhaust gas being exhausted from a production process of a gallium nitride compound semiconductor; pressurizing and cooling the filtered exhaust gas with a heat pump to liquefy ammonia contained in the filtered exhaust gas; and separating the liquefied ammonia from hydrogen and nitrogen to recover the liquefied ammonia.

Specifically, as shown in FIG. 1, the method of recovering ammonia includes: filtering exhaust gas containing ammonia, hydrogen, nitrogen, and a solid compound with a filter 10 to remove the solid compound from the exhaust gas, the exhaust gas being exhausted from a vapor deposition unit 9 for a gallium nitride compound semiconductor; pressurizing the filtered exhaust gas with a gas compressor 11 and liquefying ammonia contained in the pressurized exhaust gas with a heat pump cooler 12; and separating the liquefied ammonia from hydrogen and nitrogen to recover the liquefied ammonia as liquid.

The heat pump used in the present invention adopts the principle to draw heat of vaporization from exhaust gas when refrigerant is evaporated under reduced pressure to cool the exhaust gas. As the heat pump cooler 12 used in the present invention, for example, a cooler consisting of a refrigerant pump 17, an expansion valve 18, a condensation valve 19, a heat exchanger 20, and a liquid ammonia tank 21 can be used as shown in FIG. 2. In this cooler, liquid refrigerant sent to the expansion valve 18 by the refrigerant pump 17 vaporizes in the expansion valve 18 and draws heat from exhaust gas containing ammonia in the heat exchanger 20 to cool the exhaust gas so as to liquefy the ammonia. Then, gas refrigerant is pressurized to liquid by the condensation valve 19 and then sent back to the refrigerant pump 17. As a result, the refrigerant circulates through this cooler in this way.

In the present invention, exhaust gas is cooled by using such a principle. Therefore, the present invention has a beneficial effect of cooling ammonia compared with a method of merely exchanging heat between exhaust gas and refrigerant. Even if gas contains ammonia in a content of about 10-40 vol % like exhaust gas exhausted from a production process of a gallium nitride compound semiconductor, ammonia contained in the exhaust gas can be efficiently liquefied without an operation to remove hydrogen and nitrogen, for example, by previously bubbling exhaust gas in water to dissolve ammonia in water or an operation to substantially decrease the content of hydrogen and nitrogen.

In the present invention, refrigerant used in a heat pump cooler is not limited in particular for liquefying ammonia. However, the refrigerant is preferably the same ammonia as ammonia to be liquefied because the thermal properties are the same.

As shown in FIG. 3, when pressurized exhaust gas is supplied to the liquid ammonia tank 21, the exhaust gas supply pipe is preferably lowered into liquid ammonia 22 to bubble exhaust gas in the liquid ammonia in the point of the cooling effect. This operation facilitates the liquefaction of ammonia contained in exhaust gas.

Furthermore, liquid ammonia is preferably stirred to remove hydrogen and nitrogen from the liquid ammonia. This operation can reduce the content of hydrogen and nitrogen contained in liquid ammonia as impurities to 1000 ppm or less. The organic metal liquid source can be selected from trimethyl gallium, triethyl gallium, trimethyl indium, triethyl indium, trimethyl aluminum, and triethyl aluminum. In this case, methane or ethane is generated during vapor deposition reaction. In the present invention, methane and ethane can be removed when the ammonia is liquefied. When the above-mentioned liquid source is used, methane (boiling point: −161° C.) or ethane (boiling point: −89° C.) contained in liquid ammonia (boiling point: −33° C.) can be efficiently removed by stirring the liquid ammonia. Ammonia containing methane or ethane causes a negative effect on vapor deposition, resulting in a substrate with deteriorated properties.

The production process of a gallium nitride compound semiconductor includes, for example, source gas supply sources (organic metal compound supply source 1, nitrogen supply source 2, hydrogen supply source 3, and ammonia supply source 4), and source gas purifiers 5-8 corresponding to respective supply sources, and a vapor deposition device 9, as shown in FIG. 1. In the present invention, an organic metal liquid source (selected from trimethyl gallium, triethyl gallium, trimethyl indium, triethyl indium, trimethyl aluminum, and triethyl aluminum) is preferably gasified by bubbling hydrogen or nitrogen in the liquid source. The hydrogen and nitrogen are used as carrier gas in the production process. The organic metal can be evaporated after dissolved in an organic solvent such as THF. However, the organic solvent is disadvantageously mixed with ammonia when ammonia is liquefied and recovered.

In the method of recovering ammonia according to the present invention, exhaust gas exhausted from the above-mentioned configured production process of a gallium nitride compound semiconductor is pressurized to 0.5-2 MPaG by the gas compressor 11 in order to facilitate the liquefaction of ammonia after a metal compound such as gallium nitride that has not been deposited on a substrate is filtered by a filter 10. Then, the pressurized exhaust gas is cooled to the range from −30° C. to −60° C. in the above-mentioned heat pump cooler 12. A part of ammonia contained in exhaust gas may be liquefied when exhaust gas is pressurized by the gas compressor 11. Liquid ammonia is sent to the liquid ammonia storage tank 14. Ammonia remaining as a gas and unliquefied hydrogen and nitrogen pass through a pressure regulator 13 and then are sent to an exhaust gas purifier outside through a gas discharge line 16.

In the method of recovering ammonia according to the present invention, preferably, hydrogen is previously removed from exhaust gas to increase the partial pressure of ammonia contained in exhaust gas, and then the exhaust gas is cooled by a heat pump so as to efficiently recover ammonia. As this method, as shown in FIG. 5 for example, a hydrogen separator 33 equipped with a hydrogen separation membrane is provided between the filter 10 and the heat pump cooler 12 so as to remove a part of hydrogen from exhaust gas.

Alternatively, after ammonia is recovered, hydrogen can also be recovered from exhaust gas containing hydrogen and nitrogen and then recycled as described above. The method of recovering hydrogen after removing the ammonia includes: (1) bringing exhaust gas into contact with a palladium alloy membrane to allow hydrogen to pass through the palladium alloy membrane; (2) bringing exhaust gas into contact with an adsorbent to adsorb and remove nitrogen with the adsorbent by pressure swing adsorption; (3) liquefying nitrogen to separate nitrogen from hydrogen, or the like.

The method of recycling ammonia according to the present invention includes: evaporating liquid ammonia recovered from a production process of a gallium nitride compound semiconductor by the method of recovering ammonia; mixing the evaporated ammonia with another crude ammonia to obtain mixed gas; purifying the mixed gas; and supplying the purified gas to the production process of a gallium nitride compound semiconductor.

Specifically, as shown in FIG. 1, liquid ammonia in the liquid ammonia storage tank 14 is evaporated by the vaporizer 4, mixed and purified with ammonia supplied from the ammonia supply source by a gas mixer 15, and then supplied to the vapor deposition device 9 for a gallium nitride compound semiconductor.

In the method of recycling ammonia according to the present invention, a certain amount of ammonia recovered by the above-mentioned method of recovering ammonia can merely be recycled. However, another ammonia (crude ammonia different from the recovered ammonia) can be newly added to the recovered ammonia and continuously supplied to the vapor deposition device. In this case, the supplied amount of the newly added ammonia (crude ammonia different from the recovered ammonia) is substantially equal to the amount of ammonia removed by the above-mentioned method of recovering ammonia after exhaust gas is exhausted from a production process of a gallium nitride compound semiconductor.

In the present invention, industrial ammonia can be used, for example, containing impurities including hydrogen, nitrogen, one or more kinds of selected from oxygen, carbon dioxide, and water. In this case, the process of purifying the mixed gas of recovered ammonia and newly added ammonia includes, for example, bringing this mixed crude ammonia gas into contact with a catalyst containing manganese oxide as the active component or a catalyst containing nickel as the active component and then bringing the mixed crude ammonia gas into contact with synthetic zeolite with a pore size of about 4-10 Å to remove one or more kinds of impurities selected from oxygen, carbon dioxide, and water (JP 4640882 B2). The vapor deposition device is not limited in particular as long as a gallium nitride compound semiconductor can be produced. For example, the vapor deposition device can include a susceptor placing a substrate, a heater heating the substrate, a source gas-inducing unit supplying source gas to the substrate, a reactant gas-exhausting unit, and a light transmissive ceramic plate held or reinforced by a supporting member between the heater and the position at which the substrate is placed (JP 2007-96280 A). The vapor deposition device can also be used for a group III nitride semiconductor, including a susceptor holding a substrate, a part to which the susceptor faces, a heater heating the substrate, a source gas-inducing unit provided in the central part of the susceptor, a reactor consisting of a space between the susceptor and the part to which the susceptor faces, and a reactant gas-exhausting unit provided outside from the outer circumference of the susceptor, in which the space between the substrate and the part to which the susceptor faces is 8 mm or less in the upstream side of the substrate and 5 mm or less in the downstream side of the substrate, refrigerant flows in the part to which the susceptor faces, a material with which source gas being contact in the reactor consists of carbon, nitride, carbide, molybdenum, copper, alumina, or the composites thereof (JP 2010-232624 A). The vapor deposition device can also be used for a group III nitride semiconductor, including a susceptor holding a substrate, a part to which the susceptor faces, a heater heating the substrate, a reactor consisting of a space between the susceptor and the part to which the susceptor faces, a source gas-inducing unit supplying source gas to the reactor, and a reactant gas-exhausting unit, in which the source gas-inducing unit is provided with a first mixed gas jetting port capable of jetting mixed gas containing the three kinds of gases: ammonia, an organic metal compound, and carrier gas, in any mixture ratio, and a second mixed gas jetting port capable of jetting mixed gas containing the two or three kinds of gases selected from ammonia, an organic metal compound, and carrier gas in any mixture ratio (JP 2011-18895 A).

In the method of recovering ammonia according to the present invention, recovered ammonia, crude ammonia different from the recovered ammonia, or mixed ammonia containing these ammonias is preferably brought into contact with a filter and then with activated carbon before the purification process. According to this process, even if oil used for the compressor (oil for improving lubricity, rust prevention, etc.) is mixed with the ammonia during the production process of crude ammonia or the recovery process of ammonia, the oil causing a negative effect on vapor deposition can efficiently be removed.

EXAMPLES

The present invention will be explained in reference to the following examples. However, the present invention is not limited to these examples.

Example 1

Production of Vapor Deposition Device

In a stainless steel reaction container, a disc susceptor 24 (material: SiC-coated carbon, diameter: 600 mm, thickness: 20 mm, capable of holding five 3-inch substrates), a part to which the susceptor faces 25 (material: carbon), in which refrigerant flows, a heater 26, a source gas-introducing unit 28 (material: carbon), a reactant gas-exhausting unit 29, and the like were provided to produce a vapor deposition device 9 with a reactor 27 as shown in FIG. 4. Then, five substrates, each consisting of a 3-inch sapphire, were set in substrate holders 23. As a flow path 31 flowing refrigerant, one pipe was disposed in form of helix from the center to the circumference.

In the source gas-introducing unit, three gas jetting ports were formed. The gas jetting ports each were vertically separated by two disc partitions with a diameter of 200 mm and a thickness of 2 mm (material: carbon). Of the three gas jetting ports, the upper jetting port supplied ammonia, the middle jetting port supplied TMG-containing gas, and the lower jetting port supplied nitrogen.

The distance of the horizontal direction between the tip of the each gas jetting port and the substrate was 32.4 mm. A source gas pipe 30 was connected to each gas flow path of the source gas-inducing unit through a mass flow controller or the like so as to supply each gas at a desired flow rate and a desired concentration.

Production of Ammonia-Recovery Unit, Etc.

A filter 10 and a gas compressor 11 were installed in the exhausting pipe of the vapor deposition device. These units were also connected with a heat pump cooler 12 consisting of a refrigerant (ammonia) pump 17, an expansion valve 18, a condensation valve 19, a heat exchanger 20, and a liquid ammonia tank 21 through pipes to produce an ammonia-recovery unit 23 as shown in FIG. 3. Furthermore, a pressure regulator 13, a liquid ammonia tank (with a cylindrical shape) 21, an ammonia vaporizer 5, and the like were provided and connected through pipes and the like to produce a system as shown in FIG. 1.

Ammonia-Recovering Experimentation

The source gases were supplied from respective source gas supply sources to the above-mentioned vapor deposition device through a purifier, and gallium nitride (GaN) was grown on the surface of each substrate. As the purifying agent of crude ammonia, a catalyst containing nickel as the active component and synthetic zeolite with a pore size of about 4-10 Å were used. After the buffer layer was grown, the substrates were heated to 1050° C., ammonia (flow rate: 30 L/min), TMG (flow rate: 60 cc/min) and hydrogen (flow rate: 30 L/min), nitrogen (flow rate: 40 L/min) were supplied from the upper jetting port, the middle jetting port, and the lower jetting port, respectively, and a gallium nitride film was grown by vapor deposition for 2 hours.

Meanwhile, a part of exhaust gas exhausted from the vapor deposition device was sampled, and the gas compressor 11, the heat pump cooler 12, a stirrer, and the like were activated to liquefy ammonia contained in the exhaust gas and recover the liquefied ammonia in the liquid ammonia tank 14. The exhaust gas was pressurized from normal pressure to 1 MPaG by the gas compressor. Then, the pressurized exhaust gas was cooled to the range from −40° C. to −45° C. by the heat pump cooler.

From the measured result, the exhaust gas exhausted from the vapor deposition device contained 30% of ammonia, 30% of hydrogen, and 40% of the nitrogen. The recovery rate of ammonia in the liquid ammonia tank 21 was 79%, and the contents of hydrogen and nitrogen in the liquid ammonia were 23 ppm and 140 ppm, respectively.

Example 2

Ammonia-Recycling Experimentation

Liquid ammonia recovered as described above was sent to the liquid ammonia storage tank 14. After the vapor deposition was prepared as described above, the recovered liquid ammonia was evaporated by the vaporizer 5 and supplied to the gas mixer 15. At the same time, from the ammonia supply source, industrial ammonia was added and mixed with the recovered ammonia in an amount equal to the amount of ammonia removed after the recovering. The mixed ammonia was supplied for the vapor deposition through the purifier. The supplied amount ratio of the recovered liquid ammonia and the industrial ammonia was 79:21.

In the same way as Example 1, after the buffer layer was grown, the substrates were heated to 1050° C., ammonia (flow rate: 30 L/min), TMG (flow rate: 60 cc/min) and hydrogen (flow rate: 30 L/min), nitrogen (flow rate: 40 L/min) were supplied from the upper jetting port, the middle jetting port, and the lower jetting port, respectively, and a gallium nitride film was grown by vapor deposition for 2 hours. Meanwhile, ammonia was recovered. After the experimentation ended, the substrates were removed from the vapor deposition device and examined. It was confirmed that the substrates with the same properties as those of Example 1 were obtained. The recovery rate of ammonia in the liquid ammonia tank 21 was 80%, and the contents of hydrogen and nitrogen in the liquid ammonia were 25 ppm and 150 ppm, respectively.

Example 3

Ammonia-Re-Recycling Experimentation

Liquid ammonia recovered as described above was sent to the liquid ammonia storage tank 14 in the same way as Examples 1 and 2. After the vapor deposition was prepared in the same way as Example 2, the recovered liquid ammonia was evaporated by the vaporizer 5 and supplied to the gas mixer 15. At the same time, from the ammonia supply source, industrial ammonia was added and mixed with the recovered ammonia. The mixed ammonia was supplied for the vapor deposition through the purifier. The supplied amount ratio of the recovered liquid ammonia and the industrial ammonia was 90:10.

In the same way as Examples 1 and 2, after the buffer layer was grown, the substrates were heated to 1050° C., ammonia (flow rate: 30 L/min), TMG (flow rate: 60 cc/min) and hydrogen (flow rate: 30 L/min), nitrogen (flow rate: 40 L/min) were supplied from the upper jetting port, the middle jetting port, and the lower jetting port, respectively, and a gallium nitride film was grown by vapor deposition for 2 hours. Meanwhile, ammonia was recovered. After the experimentation ended, the substrates were removed from the vapor deposition device and examined. It was confirmed that the substrates with the same properties as those of Example 1 were obtained. As a result, the recovery rate of ammonia in the liquid ammonia tank 21 was 78%, and the contents of hydrogen and nitrogen in the liquid ammonia were 21 ppm and 140 ppm, respectively.

Example 4

Ammonia-Recovering Experimentation

Except that an ammonia-recovery unit as shown in FIG. 2 was used instead of an ammonia-recovery unit as shown in FIG. 3, a system as shown in FIG. 1 was produced in the same way as Example 1. Subsequently, the ammonia-recovering experimentation was conducted in the same way as Example 1 by using the ammonia-recovery unit as shown in FIG. 2. As a result, the recovery rate of ammonia in the liquid ammonia tank 21 was 75%, and the contents of hydrogen and nitrogen in the liquid ammonia were 40 ppm and 180 ppm, respectively.

Example 5

Ammonia-Recycling Experimentation

Liquid ammonia recovered as described above was sent to the liquid ammonia storage tank 14 in the same way as Example 2. After the vapor deposition was prepared in the same way as Example 2, the recovered liquid ammonia was evaporated by the vaporizer 5 and supplied to the gas mixer 15. At the same time, from the ammonia supply source, industrial ammonia was added and mixed with the recovered ammonia in an amount equal to the amount of ammonia removed after the recovering. The mixed ammonia was supplied for the vapor deposition through the purifier. The supplied amount ratio of the recovered liquid ammonia and the industrial ammonia was 75:25.

In the same way as Examples 1 and 2, after the buffer layer was grown, the substrates were heated to 1050° C., ammonia (flow rate: 30 L/min), TMG (flow rate: 60 cc/min) and hydrogen (flow rate: 30 L/min), nitrogen (flow rate: 40 L/min) were supplied from the upper jetting port, the middle jetting port, and the lower jetting port, respectively, and a gallium nitride film was grown by vapor deposition for 2 hours. Meanwhile, ammonia was recovered. After the experimentation ended, the substrates were removed from the vapor deposition device and examined. It was confirmed that the substrates with the same properties as those of Example 1 were obtained. As a result, the recovery rate of ammonia in the liquid ammonia tank 21 was 76%, and the contents of hydrogen and nitrogen in the liquid ammonia were 38 ppm and 190 ppm, respectively.

As described above, the method of recovering ammonia according to the present invention can efficiently easily recover ammonia from exhaust gas containing ammonia, hydrogen, nitrogen, and a solid compound, the exhaust gas being exhausted from a production process of a gallium nitride compound semiconductor. Furthermore, the method of recycling ammonia according to the present invention can recycle and supply the recovered ammonia to the production process of a gallium nitride compound semiconductor without causing a negative effect on vapor deposition.

REFERENCE SIGNS LIST

1 Organic metal compound supply source
2 Nitrogen supply source
3 Hydrogen supply source
4 Ammonia supply source
5 Vaporizer
6 Nitrogen purifier
7 Hydrogen purifier
8 Ammonia purifier
9 Vapor deposition device
10 Filter
11 Gas compressor
12 Heat pump cooler
13 Pressure regulator
14 Liquid ammonia storage tank
15 Gas mixer
16 Gas discharge line to outside
17 Refrigerant pump
18 Expansion valve
19 Condensation valve
20 Heat exchanger
21 Liquid ammonia tank
22 Liquid ammonia
23 Substrate holder
24 Susceptor
25 Part to which susceptor faces
26 Heater
27 Reactor
28 Source gas-inducing unit
29 Reactant gas-exhausting unit
30 Source gas pipe
31 Flow path circulating refrigerant
32 Susceptor rotating plate
33 Hydrogen separator

What is claimed is:

1. A method of recovering ammonia comprising: filtering exhaust gas containing ammonia, hydrogen, nitrogen, and a solid compound with a filter to remove the solid compound from the exhaust gas, the exhaust gas being exhausted from a production process of a gallium nitride compound semiconductor; pressurizing and cooling the filtered exhaust gas with a heat pump to liquefy ammonia contained in the filtered exhaust gas; and separating the liquefied ammonia from hydrogen and nitrogen to recover the liquefied ammonia.

2. The method of recovering ammonia according to claim 1, wherein the exhaust gas contains ammonia in content of 10-40 vol %.

3. The method of recovering ammonia according to claim 1, wherein the exhaust gas during the pressurizing has a pressure of 0.5-2 MPaG.

4. The method of recovering ammonia according to claim 1, wherein the exhaust gas during the cooling has a temperature from −30° C. to −60° C.

5. The method of recovering ammonia according to claim 1, comprising bubbling the pressurized exhaust gas in liquid ammonia.

6. The method of recovering ammonia according to claim 5, comprising stirring the liquid ammonia to remove hydrogen and nitrogen from the liquid ammonia.

7. The method of recovering ammonia according to claim 6, comprising stirring the liquid ammonia to remove methane or ethane together with hydrogen and nitrogen, the methane or ethane being generated when an organic metal source selected from trimethyl gallium, triethyl gallium, trimethyl indium, triethyl indium, trimethyl aluminum, and triethyl aluminum is degraded.

8. The method of recovering ammonia according to claim 1, comprising separating methane or ethane from ammonia when the ammonia contained in the exhaust gas is liquefied, the methane or ethane being generated when an organic metal source selected from trimethyl gallium, triethyl gallium, trimethyl indium, triethyl indium, trimethyl aluminum, and triethyl aluminum is degraded during vapor deposition.

9. The method of recovering ammonia according to claim 1, wherein refrigerant used for the cooling with a heat pump is ammonia.

10. The method of recovering ammonia according to claim 1, wherein carrier gases used in a production process of a gallium nitride compound semiconductor is hydrogen and nitrogen.

11. The method of recovering ammonia according to claim 1, wherein source gas containing an organic metal used in a production process of a gallium nitride compound semiconductor is obtained by bubbling hydrogen or nitrogen in an organic metal liquid source selected from trimethyl gallium, triethyl gallium, trimethyl indium, triethyl indium, trimethyl aluminum, and triethyl aluminum.

12. The method of recovering ammonia according to claim 1, comprising reducing the content of hydrogen and nitrogen contained in the liquid ammonia as impurities to 1000 ppm or less.

13. The method of recovering ammonia according to claim 1, comprising bringing the exhaust gas into contact with a hydrogen separation membrane between filtering the exhaust gas with a filter and cooling the filtered exhaust gas with a heat pump to remove a part of hydrogen from the exhaust gas.

14. A method of recycling ammonia comprising: evaporating liquid ammonia recovered from a production process of a gallium nitride compound semiconductor by the method of recovering ammonia according to claim 1; mixing the evaporated ammonia with another crude ammonia to obtain mixed gas; purifying the mixed gas; and supplying the purified gas to the production process of a gallium nitride compound semiconductor.

15. The method of recycling ammonia according to claim 14, wherein the supplied amount of crude ammonia different from the recovered ammonia is substantially equal to the amount of ammonia removed by the method of recovering ammonia.

16. The method of recycling ammonia according to claim 14, wherein the crude ammonia different from the recovered ammonia is industrial ammonia containing hydrogen and nitrogen as impurities.

17. The method of recycling ammonia according to claim 14, comprising bringing recovered ammonia, crude ammonia different from the recovered ammonia, or mixed ammonia containing thereof into contact with a filter and then with activated carbon to remove oil from the crude ammonia before purification.

18. The method of recovering ammonia according to claim 1, wherein said filtered exhaust gas, which is pressurized and cooled, contains ammonia, hydrogen and nitrogen.

* * * * *